(12) United States Patent
Kaneko et al.

(10) Patent No.: US 11,620,908 B2
(45) Date of Patent: Apr. 4, 2023

(54) IMAGE PROCESSOR AND IMAGE PROCESSING METHOD

(71) Applicant: Faurecia Clarion Electronics Co., Ltd., Saitama (JP)

(72) Inventors: Takayuki Kaneko, Saitama (JP); Shunsuke Kondo, Saitama (JP); Mamoru Kubota, Sagamihara (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 17/171,162

(22) Filed: Feb. 9, 2021

(65) Prior Publication Data

US 2021/0248909 A1 Aug. 12, 2021

(30) Foreign Application Priority Data

Feb. 12, 2020 (JP) .............................. JP2020-021396

(51) Int. Cl.
| | |
|---|---|
| *G08G 1/16* | (2006.01) |
| *G06T 7/136* | (2017.01) |
| *G06T 7/13* | (2017.01) |
| *G06T 7/60* | (2017.01) |

(Continued)

(52) U.S. Cl.
CPC .............. *G08G 1/168* (2013.01); *G06T 7/13* (2017.01); *G06T 7/136* (2017.01); *G06T 7/60* (2013.01);
(Continued)

(58) Field of Classification Search
CPC .... G06V 20/586; G06V 20/588; G06V 10/44; G06V 20/58; G06V 10/50;
(Continued)

(56) References Cited

U.S. PATENT DOCUMENTS

| | | |
|---|---|---|
| 2014/0244070 A1 | 8/2014 | Inagaki et al. |
| 2015/0291030 A1 | 10/2015 | Oiki et al. |

(Continued)

FOREIGN PATENT DOCUMENTS

| | | |
|---|---|---|
| CN | 110414355 | 11/2019 |
| EP | 2 927 076 | 10/2015 |

(Continued)

OTHER PUBLICATIONS

Extended European Search Report dated Jul. 12, 2021 in corresponding European Patent Application No. 21155617.0.

*Primary Examiner* — Xiao M Wu
*Assistant Examiner* — Scott E Sonners
(74) *Attorney, Agent, or Firm* — Wenderoth, Lind & Ponack, L.L.P.

(57) ABSTRACT

An image processor includes a parking area line detection portion configured to detect a parking area line from an image acquired by an imaging device, a parking frame setting portion configured to set a parking frame based on the detected parking area line, a parking frame selection portion configured to calculate a length ratio of adjacent first and second sides of the set parking frame, determine the parking frame as a display target when the length ratio falls within a predetermined range, and not to determine the parking frame as the display target when the length ratio falls outside the predetermined range, and a display control portion configured to control a display portion for displaying a parking frame image showing the parking frame determined as the display target by the parking frame selection portion so as to keep superimposing the parking frame image onto the image.

5 Claims, 9 Drawing Sheets

(51) Int. Cl.
*G06T 11/20* (2006.01)
*H04N 5/272* (2006.01)
*G06V 20/58* (2022.01)

(52) U.S. Cl.
CPC .......... *G06T 11/203* (2013.01); *G06V 20/586* (2022.01); *H04N 5/272* (2013.01); *G06T 2207/30264* (2013.01)

(58) Field of Classification Search
CPC .............. B62D 15/0285; B62D 15/027; B62D 15/0275; B60W 30/06; B60W 2552/53; G08G 1/168; G06T 2207/30264; G06T 11/203; G06T 11/00; G06T 7/13; G06T 7/136; G06T 7/60; G06T 7/62
See application file for complete search history.

(56) References Cited

U.S. PATENT DOCUMENTS

2017/0177956 A1   6/2017  Zhang
2018/0322349 A1 * 11/2018  Hayakawa ........... B62D 15/027
2020/0307616 A1 * 10/2020  Nithiyanantham .........................
                                                G02B 27/0101

FOREIGN PATENT DOCUMENTS

| JP | 3-99952 | 4/1991 | |
| JP | 2003-118522 | 4/2003 | |
| JP | 2014-166834 | 9/2014 | |
| KR | 10-2018-0102397 | 9/2018 | |
| WO | WO-2016002405 A1 * | 1/2016 | ............... B60R 1/00 |

* cited by examiner

IMAGE PROCESSOR AND IMAGE PROCESSING METHOD

CROSS-REFERENCE TO RELATED APPLICATION

The present application is based on and claims priority from Japanese Patent Application No. 2020-021396 filed on Feb. 12, 2020, the disclosure of which is hereby incorporated by reference in its entirety.

FIELD OF THE INVENTION

The present disclosure relates to an image processor and an image processing method that estimate a parking frame on a road surface based on an image signal output from an imaging device that images a road surface around a vehicle.

BACKGROUND

A parking assist device is practically used, which automatically parks a vehicle by automatically detecting a parking frame as a parking target when a vehicle is parked in a predetermined parking area (see JP2014-166834A, for example). With a technique disclosed in JP2014-166834A, a parking area line is detected from an image, for example, captured by an imaging portion to detect a region surrounded by a pair of parking area lines as an available parking target position, i.e., a parking frame, and a parking frame image showing the detected parking frame and the captured image are superimposed to be displayed on a display.

On the occasion of detecting the parking area line, the parking area line may not be detected or a line except the parking area line may be misdetected as a parking area line due to relatively large shadow of a vehicle, a wall, a fence, and the like, shadows of leaves of trees, reflection by a road illumination lamp, and existence of an obstacle. In this case, when the parking frame is displayed on a display of an onboard device based on the detected parking area line, the parking frame may be unstably displayed according to a detection situation in a detection timing of the parking frame. A driver cannot clearly see such a display, and also cannot easily detect the parking frame. Accordingly, technical development capable of solving such a problem is demanded.

It is, therefore, an object of the present disclosure to provide an image processor and an image processing method capable of clearly displaying a parking frame and detecting the parking frame with high accuracy.

SUMMARY

To achieve the above object, the present disclosure provides an image processor including a parking area line detection portion configured to detect a parking area line from an image acquired by an imaging device configured to image a road surface around a vehicle, a parking frame setting portion configured to set a parking frame based on the detected parking area line, a parking frame selection portion configured to calculate a length ratio of adjacent first and second sides of the set parking frame, determine the parking frame as a display target when the length ratio falls within a predetermined range, and not to determine the parking frame as the display target when the length ratio falls outside the predetermined range, and a display control portion configured to control a display portion for displaying a parking frame image showing the parking frame determined as the display target by the parking frame selection portion so as to keep superimposing the parking frame image onto the image acquired by the imaging device.

The present disclosure also provides an image processing method including a parking area line detection step of detecting a parking area line from an image acquired by an imaging device that images a road surface around a vehicle, a parking frame setting step of setting a parking frame based on the detected parking area line, a parking frame selection step of calculating a length ratio of adjacent first and second sides of the set parking frame to determine the parking frame as a display target when the length ratio falls within a predetermined range and not to determine the parking frame as the display target when the length ratio falls outside the predetermined range, and a display control step of sending a display control signal for displaying a parking frame image showing the parking frame determined as the display target by the parking frame selection step so as to keep superimposing the parking frame image onto the image acquired by the imaging device.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
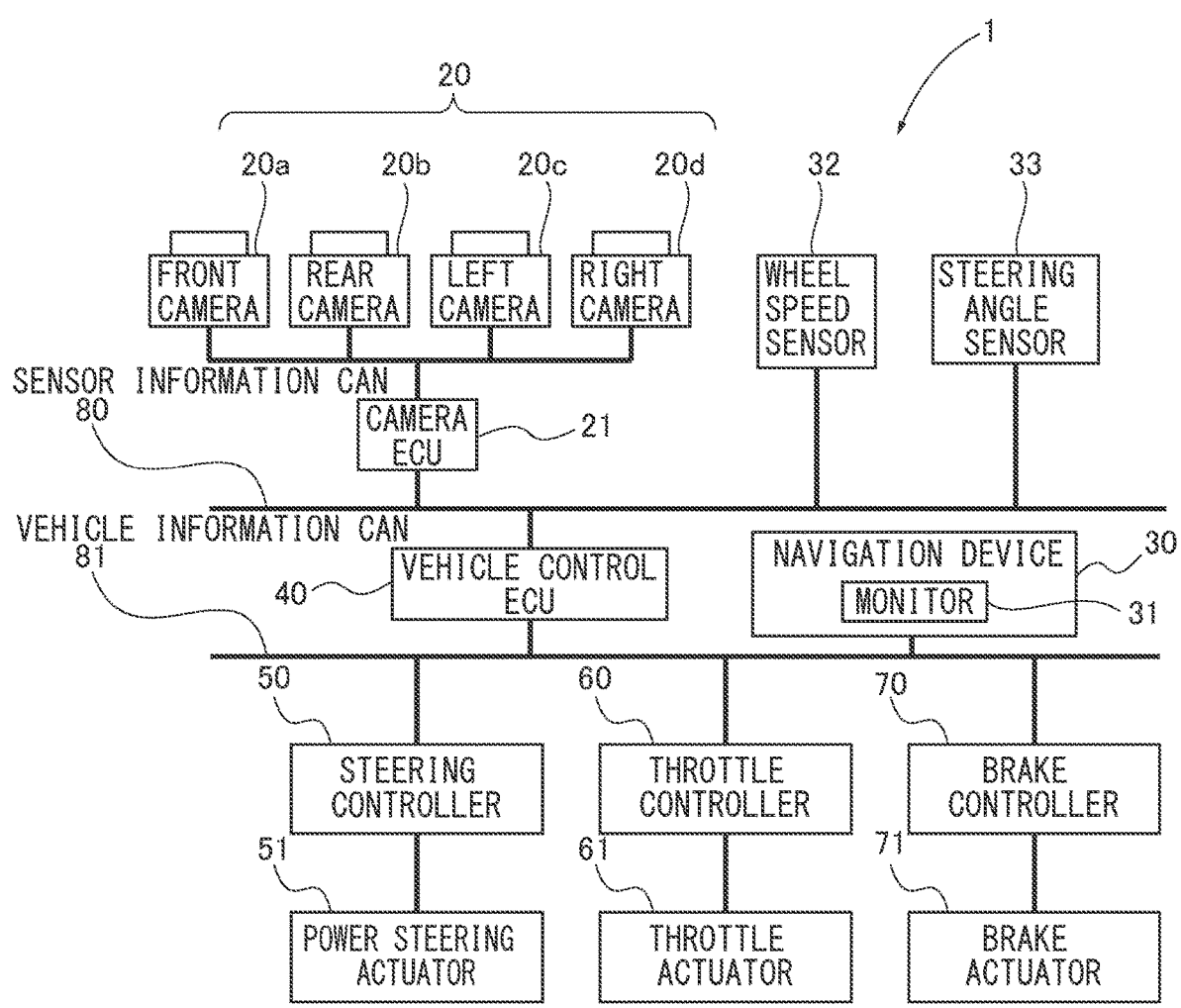
FIG. 1 is a block diagram illustrating a schematic configuration of a parking assist device to which an image processor of an embodiment of the present disclosure is applied.
Figure 2:
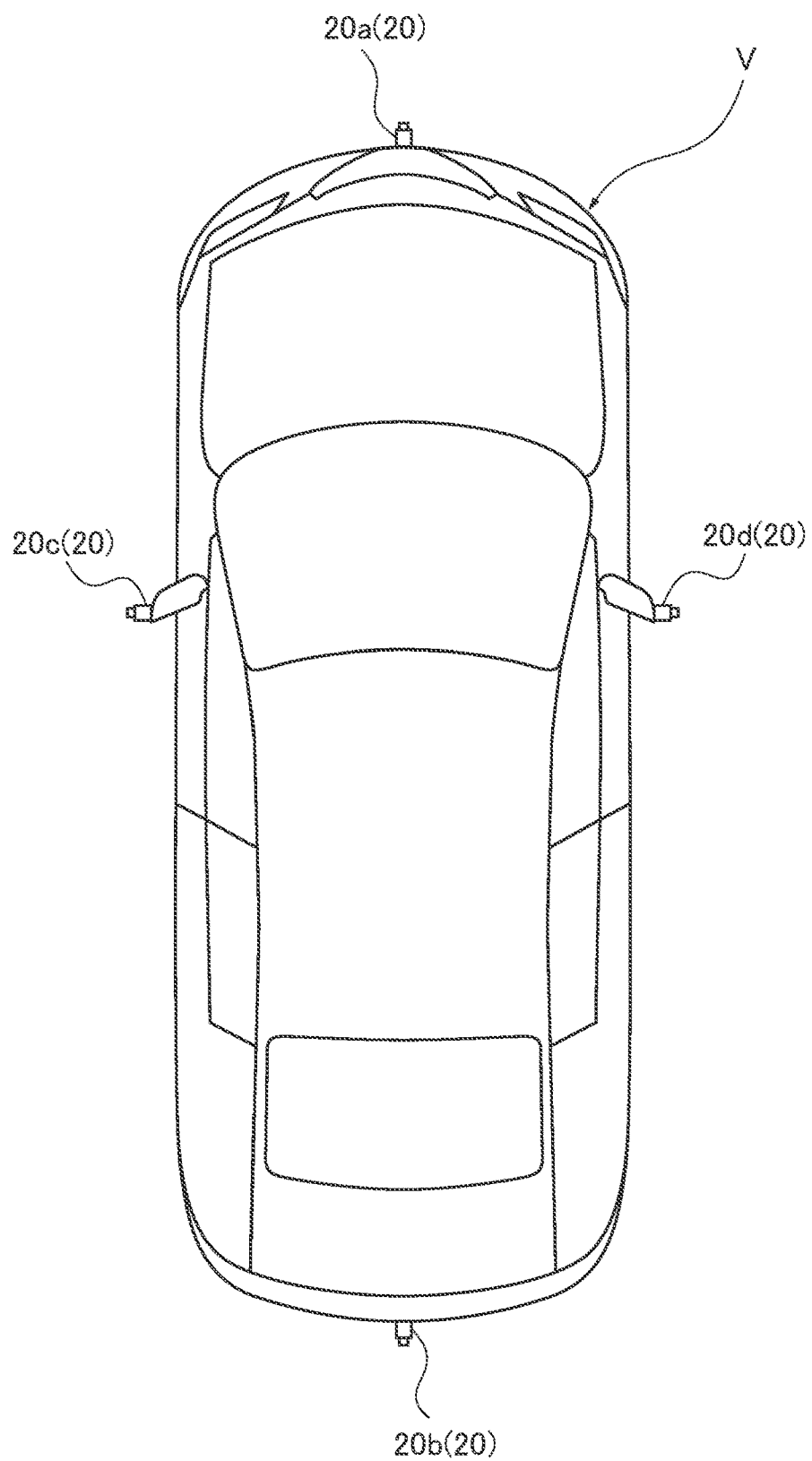
FIG. 2 is a view illustrating one example of positions of imaging devices of the parking assist device of the embodiment.

Hereinafter, an embodiment of the present disclosure will be described with reference to the drawings. A schematic configuration of a parking assist device will be described. FIG. 1 is a block diagram illustrating a schematic configuration of a parking assist device to which an image processor of an embodiment of the present disclosure is applied. FIG. 2 is a view illustrating one example of positions of imaging devices of the parking assist device. Hereinafter, the parking assist device will be described. However, a device to which the image processor of the embodiment of the present disclosure is applied is not limited to the parking assist device, and the image processor may be applied to a traveling assist device that assists traveling of a vehicle on a traveling lane.

As illustrated in FIG. 1, a vehicle V (refer to FIG. 2) is equipped with a parking assist device 1 that performs a parking assist operation. More specifically, the parking assist device 1 recognizes a parking frame in which the vehicle V can be parked. The parking assist device 1 controls the vehicle V such that the vehicle V is parked in the recognized parking frame.

A plurality of small cameras (imaging devices) are mounted on front and rear portions and right and left portions of the vehicle V, as illustrated in FIG. 2. More specifically, a front camera 20a facing the front of the vehicle V is mounted on a front bumper or a front grille of the vehicle V. A rear camera 20b facing the rear of the vehicle V is mounted on a rear bumper or a rear garnish of the vehicle V. A left camera 20c facing the left side of the vehicle V is mounted on a left door mirror of the vehicle V. A right camera 20d facing the right side of the vehicle V is mounted on a right door mirror of the vehicle V.

Each of the front camera 20a, the rear camera 20b, the left camera 20c, and the right camera 20d is equipped with a wide angle lens or a fisheye lens capable of observing a wide range. A region including a road surface around the vehicle V can be completely observed by the four cameras 20a to 20d. The cameras 20a to 20d constitute the imaging devices that image the road surface around the vehicle V. In the following description, the respective cameras (imaging devices) 20a to 20d are simply referred to as a camera 20 without distinguishing the respective cameras (imaging devices) 20a to 20d.

Referring back to FIG. 1, the parking assist device 1 includes the front camera 20a, the rear camera 20b, the left camera 20c, the right camera 20d, a camera ECU 21, a navigation device 30, a wheel speed sensor 32, and a steering angle sensor 33.

The camera ECU 21 includes a microcomputer, as a main body, having a Central Processing Unit (CPU), a Read Only Memory (ROM), a Random Access Memory (RAM), and a flush memory. The camera ECU 21 controls the camera 20, and performs a creation process of creating an overhead image, a detection process of detecting a parking frame, and a determination process of determining whether or not the vehicle V can be parked in the detected parking frame by using information detected by the camera 20.

The navigation device (display device) 30 includes a monitor 31 having an image display function. The navigation device 30 includes a memory in which, for example, map data for guiding a route is stored. The navigation device 30 guides a route to a destination set by an operator of the navigation device 30 based on the map data and the present position of the vehicle V detected by a GPS device (not shown), for example. Various images during a route guidance operation are displayed on the monitor 31.

The wheel speed sensor 32 detects a wheel speed of the vehicle V. The information (wheel speed) detected by the wheel speed sensor 32 is input to a vehicle control ECU 40.

The steering angle sensor 33 detects a steering angle of the vehicle V. The steering angle sensor 33 outputs a rotation angle from a neutral position (0 degree) as the steering angle. The steering angle when the vehicle V travels straight is set as the neutral position (0 degree). The information (steering angle) detected by the steering angle sensor 33 is input to the vehicle control ECU 40.

The parking assist device 1 includes the vehicle control ECU 40, a steering controller 50, a throttle controller 60, and a brake controller 70.

The vehicle control ECU 40 includes a microcomputer, as a main body, having a Central Processing Unit (CPU), a Read Only Memory (ROM), a Random Access Memory (RAM), and a flush memory. The vehicle control ECU 40 executes various processes that assist the parking of the vehicle V based on the various information input from the camera ECU 21, the wheel speed sensor 32, and the steering angle sensor 33.

More specifically, when a driver starts the parking assist device 1 by turning on an automatic parking start switch (not shown), for example, the vehicle control ECU 40 executes an automatic parking process of automatically parking the vehicle V in a parking frame determined as an available parking frame by the camera ECU 21.

The steering controller 50 controls the steering angle of the vehicle V by driving a power steering actuator 51 based on the vehicle control information determined by the vehicle control ECU 40.

The throttle controller 60 controls the throttle of the vehicle V by driving a throttle actuator 61 based on the vehicle control information determined by the vehicle control ECU 40.

The brake controller 70 controls the brake of the vehicle V by driving a brake actuator 71 based on the vehicle control information determined by the vehicle control ECU 40.

The camera ECU 21, the wheel speed sensor 32, the steering angle sensor 33, and the vehicle control ECU 40 are connected by a sensor information Controller Area Network (CAN) (registered trademark) 80 which is an interior Local Area Network (LAN).

The steering controller 50, the throttle controller 60, the brake controller 70, and the vehicle control ECU 40 are connected by a vehicle information CAN (registered trademark) 81 which is the interior LAN.

In the parking assist device 1 having the above configuration, the image processor 100 of the embodiment is mainly constituted by the camera ECU 21.

Figure 3:
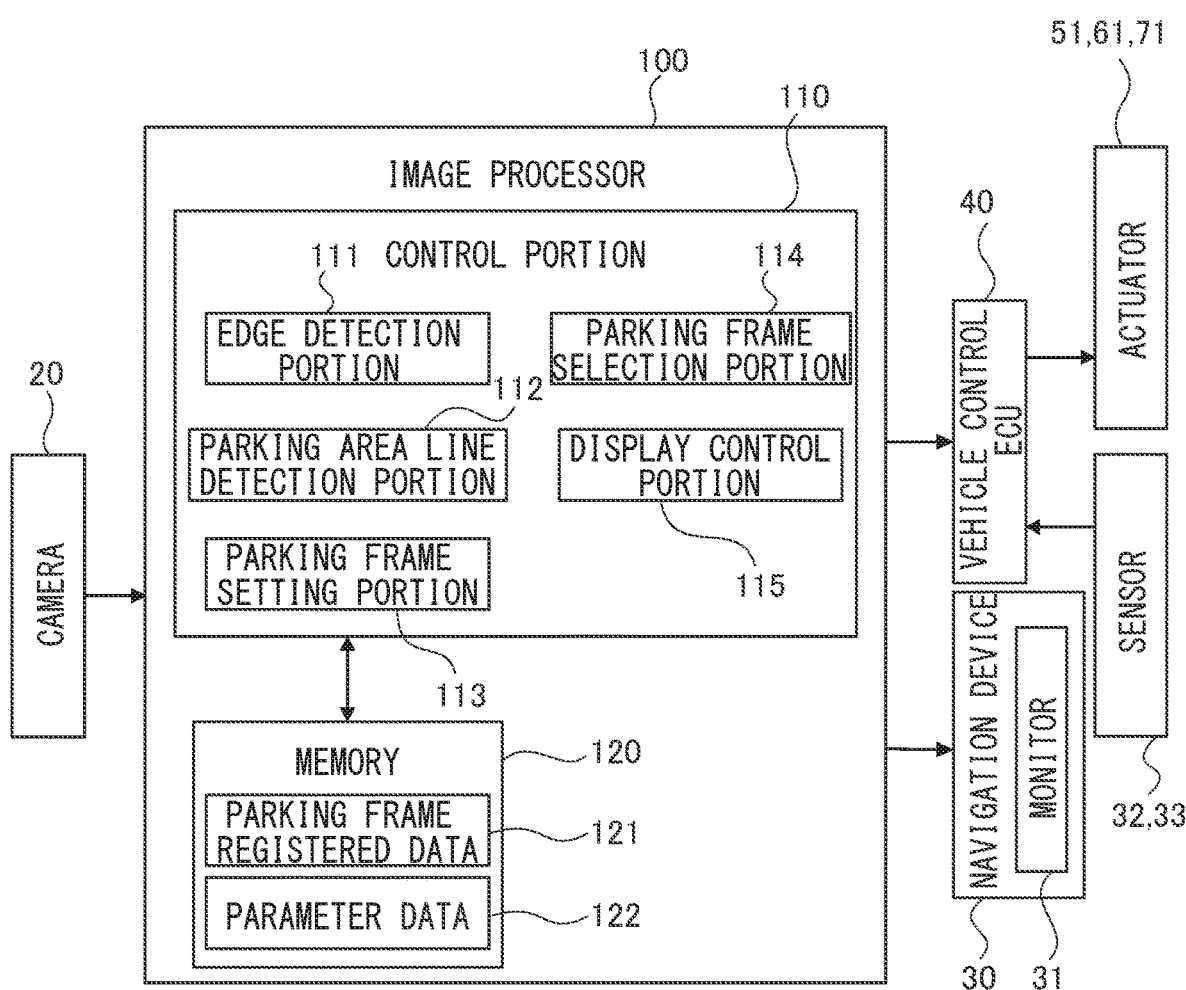
FIG. 3 is a functional block diagram illustrating a schematic configuration of the image processor of the embodiment.

The functional configuration of the image processor will be described. FIG. 3 is a functional block diagram illustrating a schematic configuration of the image processor 100 of the embodiment. The image processor 100 of the embodiment includes a control portion 110 and a memory 120. The control portion 110 is mainly constituted by the CPU of the camera ECU 21, and the memory 120 is mainly constituted by the ROM, the RAM, the flash memory, and the like of the camera ECU 21.

The control portion 110 controls the entire image processor 100. The control portion 110 sends information required for the automatic parking process (for example, position and shape of parking space and parking frame) to the vehicle control ECU 40, so that the vehicle control ECU 40 executes the automatic parking process of automatically parking the vehicle V in the parking frame determined as an available parking frame based on the parking space and the parking area lines that divide the parking space detected and estimated by an edge detection portion 111, a parking area line detection portion 112, a parking frame setting portion 113, and a parking frame selection portion 114 which will be described later.

The vehicle control ECU 40 controls the power steering actuator 51, the throttle actuator 61, and the brake actuator 71 (simply recited as actuator in FIG. 3) based on the information provided from the control portion 110 and the information detected by the wheel speed sensor 32 and the steering angle sensor 33 (simply recited as sensor in FIG. 3).

The control portion 110 includes a calculation element represented by an integrated circuit such as a programmable logic device and an ASIC. The programmable logic device includes a CPU and an FPGA.

A control program (not shown) is stored in the memory 120 of the image processor 100. This control program is executed by the control portion 110 at the startup of the image processor 100. The image processor 100 includes a functional configuration as illustrated in FIG. 3. In particular, as the image processor 100 executes an after-described high speed image process, it is preferable for the image processor 100 to have a calculation element capable of calculating at high speed, for example, an FPGA.

As illustrated in FIG. 3, the control portion 110 includes the edge detection portion 111, the parking area line detection portion 112, the parking frame setting portion 113, the parking frame selection portion 114, and the display control portion 115.

Figure 5:
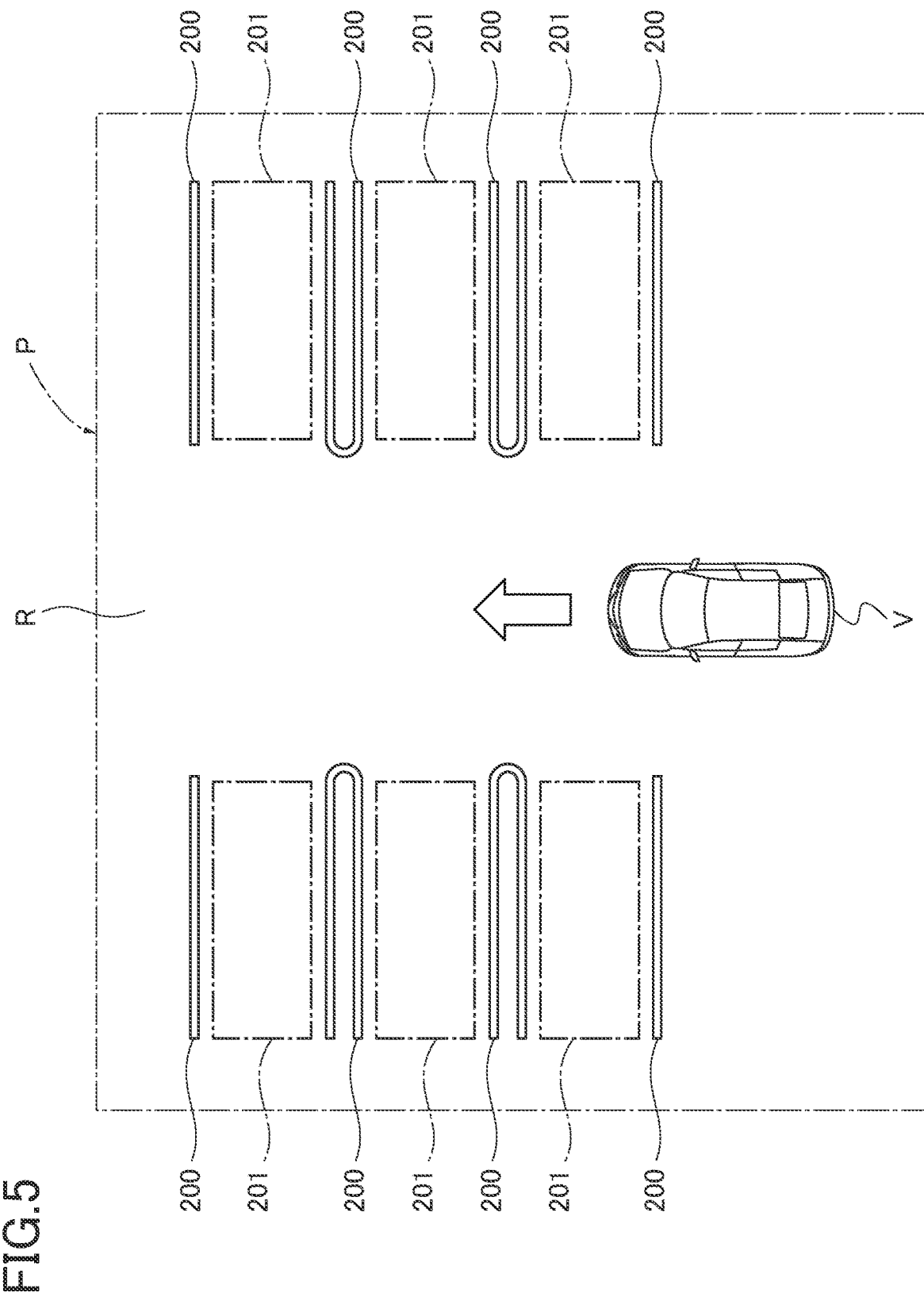
FIG. 5 is a view describing one example of an operation of the image processor of the embodiment, and illustrating one example of parking area lines drawn on a load surface of a parking lot.

The edge detection portion 111 detects an edge of a parking area line 200 on a road surface R of a parking lot P, for example, by edge detection based on the image signal output from the camera 20 that images the road surface R around the vehicle V. The parking area line 200 is drawn as a borderline (straight line) that divides a parking region provided mainly on the road surface R. FIG. 5 illustrates one example of the vehicle V and the parking area lines 200 drawn on the road surface R of the parking lot P for the vehicle V to be parked. A parking frame 201 representing a parking space is provided between the parking area lines 200.

Figure 6:
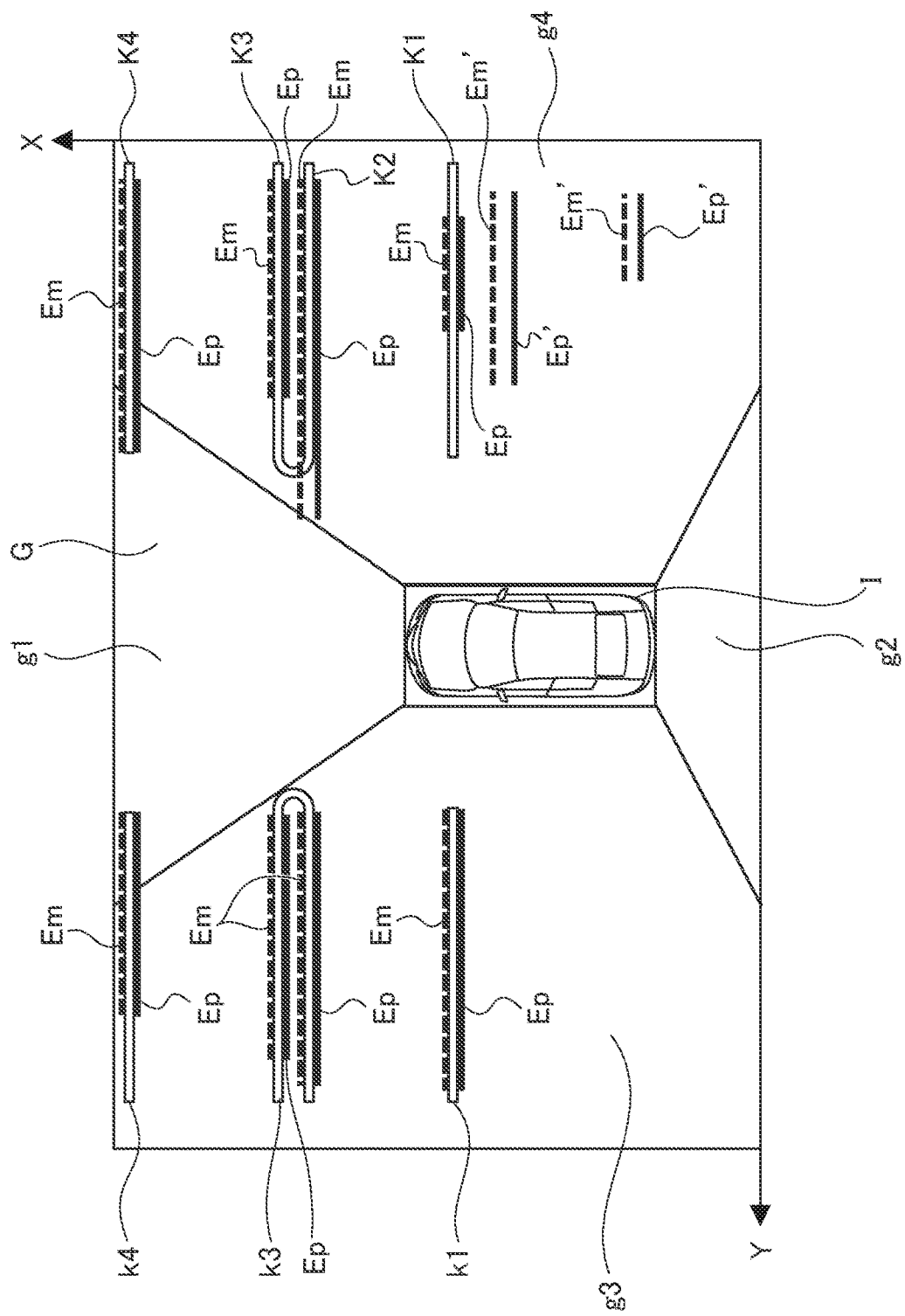
FIG. 6 is a view describing one example of an operation of the image processor of the embodiment, and schematically illustrating an overhead image and edges detected from the overhead image.

FIG. 6 is a view schematically illustrating an overhead image G created by synthesizing the image signals taken by the camera 20 and edges detected from the overhead image G. The overhead image G in FIG. 6 includes an X axis and a Y axis. The X axis extends in a direction orthogonal to an extending direction of the parking area line, which is a direction along a traveling direction of the vehicle V. The Y axis extends in the extending direction of the parking area line.

The overhead image G illustrated in FIG. 6 is created by converting images based on the image signals taken by the cameras 20a to 20d into overhead images g1, g2, g3, g4 in which the vehicle V is viewed from the just above, and synthesizing the respective overhead images g1 to g4. An icon I representing that the vehicle V is viewed from the just above is displayed in the center portion of the overhead image G.

The parking area line is generally drawn by a white line, but may be drawn by a colored line except a white line, for example, a yellow line. The parking area line detected by the edge detection portion 111 is not limited to the white line, and a borderline having a contrast with respect to a road surface is generally detected as the parking area line.

The edge detection portion 111 scans the image in a predetermined direction to detect a pixel in which a variation of a brightness or a color parameter (for example, RGB, RGBA) contained in the image signal increases to be larger than a threshold with respect to an adjacent pixel, and detects a portion in which the detected pixel array has a predetermined length or more as an edge. The scanning described herein is meant to select a pixel one by one in the predetermined direction, and compare the brightness or the color parameter between the adjacent pixels. The detected edge is referred to as a first edge or a second edge according to a direction (trend) of a change in the color parameter or the brightness.

In addition, it is preferable for the scanning direction to be set to the direction orthogonal to the parking area line drawn on the road surface R. More specifically, as illustrated in FIG. 5, when the parking area line 200 extends in the direction orthogonal to the traveling direction (refer to arrow in FIG. 5) of the vehicle V, it is preferable to scan in the traveling direction on the overhead image G (refer to FIG. 6). On the other hand, when the parking area line 200 extends in the traveling direction of the vehicle V, it is preferable to scan in the direction orthogonal to the traveling direction on the overhead image G. As the direction in which the parking area line 200 extends is generally unknown, it is desirable for the edge detection portion 111 to scan twice in both of the traveling direction of the vehicle V and the direction orthogonal to the traveling direction on the overhead image G.

The edge detection portion 111 detects the first edge (also referred to as positive edge and rising edge) and the second edge (also referred to as negative edge and falling edge) from the detected plurality of edges. The first edge has a brightness difference or a color parameter difference of the adjacent pixels larger than a predetermined value in the positive direction, and the second edge has a brightness difference or a color parameter difference of the adjacent pixels larger than a predetermined value in the negative direction.

When the edge is extracted based on the brightness, the pixel array changed (changed in positive direction) into high brightness bright pixels (for example, white pixels) having a difference larger than a threshold is detected from low brightness dark pixels (for example, black pixels) as the positive edge. That is, the change in the brightness in the positive direction shows that the scanning position is switched to a position estimated as the parking area line from the road surface R. The pixel array changed (changed in negative direction) into low brightness dark pixels having a difference larger than the threshold is detected from high brightness bright pixels as the negative edge. That is, the change in the brightness in the negative direction shows that the scanning position is switched to the road surface R from the position estimated as the parking area line.

On the other hand, when the edge is extracted based on the color parameter, the color parameter of the road surface and the color parameter of the parking area line are compared. The edge detection portion 111 detects the pixel array in which the value of the color parameter is changed in the increase direction (changed in negative direction) as the negative edge and the pixel array in which the value of the color parameter is changed in the decrease direction (changed in positive direction) as the positive edge. When the brightness of the parking area line is lower than that of the road surface (or color parameter is larger), the changes in the brightness and the color parameter are reversed. In any case, the positive edge and the negative edge are detected on the first and second side edges of the borderline such as the parking area line, which makes later-described pair extraction possible.

By repeating the above scanning for a plurality of lines, a line segment (pixel arrangement, pixel array) constituted by the consecutive positive edges in the direction crossing the scanning direction is extracted as the line segment of the positive edge (first edge). A line segment (pixel array) constituted by the consecutive negative edges is extracted as the line segment of the negative edge (second edge). The extracted line segment of the positive edge and the extracted line segment of the negative edge are filtered by a length according to a reference length, and the line segment of the positive edge and the line segment of the negative edge, which do not meet the reference length, are cancelled. In addition to the length, the line segments may be filtered by a direction (angle) in which a line segment extends.

The reference length may be set to a length (for example, 5 m) of the vehicle V. However, when the parking area line is short, the reference length is set to a length shorter than the vehicle. The angle may be set to an angle in consideration of the traveling direction of the vehicle V, the direction of the camera 20 which has taken an image, and the like. In FIG. 6, as the parking area line is a straight line extending at an approximate right angle toward a parking space with respect to the traveling direction, the angle=90°±permissible error.

FIG. 6 illustrates the positive edges detected from the overhead image G by thick solid lines and the negative edges by thick broken lines. In the example of FIG. 6, line segments Ep of the positive edges and line segments Em of the negative edges are detected in both of the edge portions of the right parking area lines (in fact, parking area line images) K1 to K4 and the edge portions of the left parking area lines k1 to k4 of the vehicle V (icon I). The line segments Ep are detected on the scanning start side in the X axis direction in the both edge portions and the line segments Em are detected on the scanning end side in the X axis direction in the both end portions. The edges shorter than the actual parking frame lines are detected for the parking area lines K1, K3, k4 and the edges projecting toward the vehicle V longer than the actual parking frame lines are detected for the parking area line K2. Line segments Ep' of the positive edges and line segments Em' of the negative edges are detected for the portions except the parking area lines. These are estimated as the break of the parking frame line, the combination with the noise line, the misdetection of the noise, and the like due to shadow, reflection of light, and existence of an obstacle, for example. Due to the effect of the distortion correction of the lens of the camera 20 and the overhead conversion of the image, the error may occur in the detection of the parking area line.

The parking area line detection portion 112 detects the parking area line based on the edge detected by the edge detection portion 111. More specifically, the parking area line detection portion 112 calculates the positions (coordinates) of the start point and the finish point of each of the line segment Em of the negative edge and the line segment Ep of the positive edge, which are remained after the filtering. The line segment of the positive edge and the line segment of the negative edge next to each other with a predetermined distance are extracted based on the calculated positions to be determined as a pair of the edges constituting the parking area lines. For example, when the distance between the positive edge and the negative edge falls within the range of width of parking area line±permissible error, these are determined as the pair. On the other hand, the line segment of the edge extending in a direction except the vertical direction and the line segment of the edge which cannot find the pair are cancelled as noise.

In the example of FIG. 6, the parking area lines K1 to K4 and the parking area lines k1 to k4 are detected. The parking area lines are also detected between the two pairs of the line segment Ep' of the positive edge and the line segment Em' of the negative edge which are noise.

The parking frame setting portion 113 estimates the parking frame based on the pair of the edges constituting the parking area lines detected by the parking area line detection portion 112 to be set on the overhead image G. The parking frame setting portion 113 selects the adjacent two line segments of the edges which may constitute the parking space from the plural pairs of the line segments of the positive edges and the line segments of the negative edges. The selected two line segments of the edges are lines constituting right and left both ends of a pair of parking area lines dividing the parking space. These line segments are, for example, the line segment Em of the negative edge of the parking area line K1 and the line segment Ep of the positive edge of the parking area line K2 next to the line segment Em in FIG. 6.

The parking frame setting portion 113 calculates a distance between the selected two edge lines (inner measurement of adjacent parking area lines) based on the coordinate value of the end point of each edge, and determines whether or not the calculated distance falls within a predetermined range. When the distance falls within the range of predetermined space width±permissible error, the region divided by the two edge lines is detected as the parking space. It is preferable for the parking space width to be 2 m to 3 m if it is a parking space for a standard vehicle and a small vehicle, and to be 3.3 m or more if it is a parking space for a large vehicle and a bus.

Figure 7:
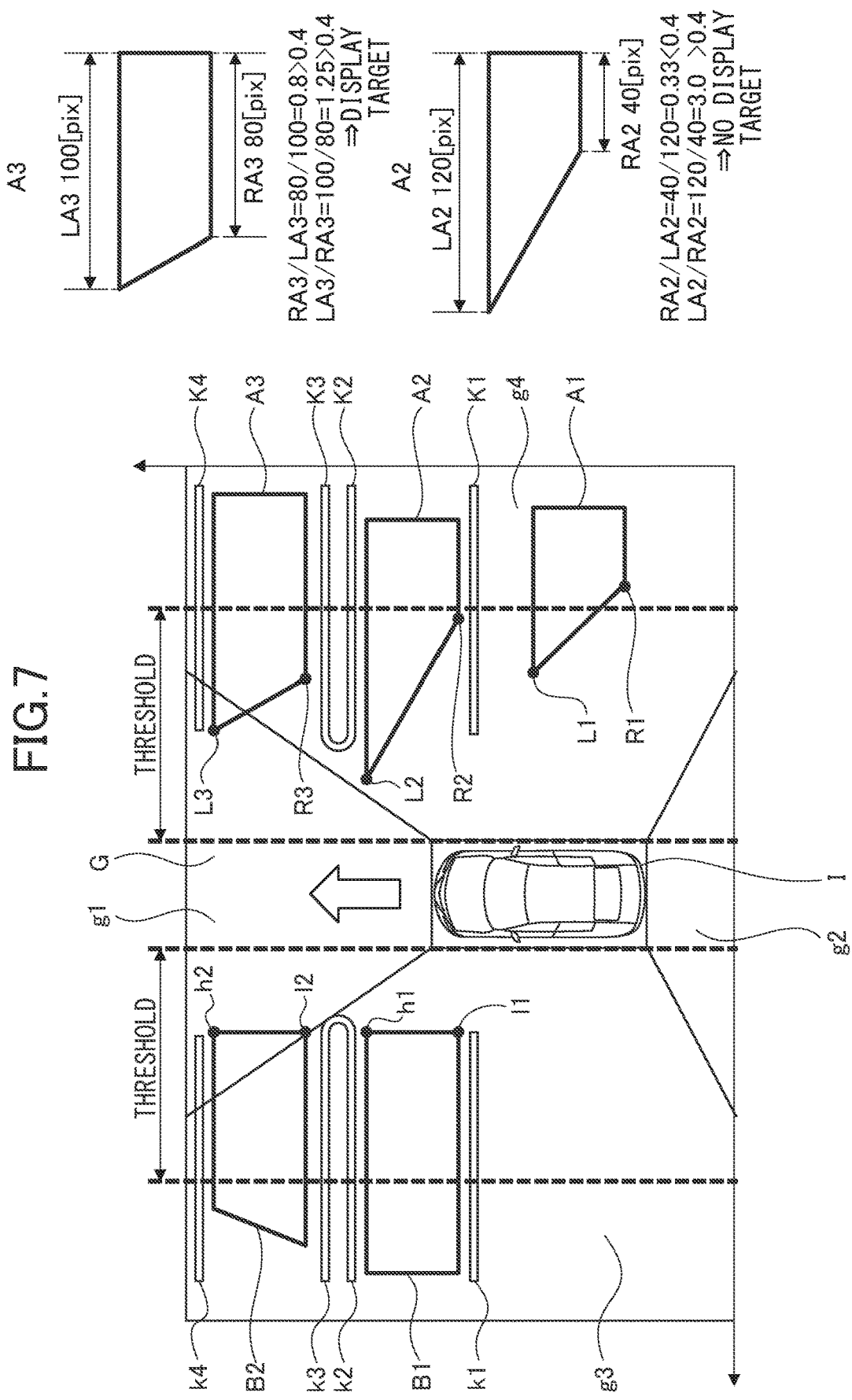
FIG. 7 is a view describing one example of an operation of the image processor of the embodiment, and describing a procedure of a parking frame selection process by a parking frame selection portion.

FIG. 7 schematically illustrates the parking frames detected based on the edges detected from the overhead image G illustrated in FIG. 6. As illustrated in FIG. 7, a parking frame A2 is detected between the parking area lines K1, K2, a parking frame A3 is detected between the parking area lines K3, K4, a parking frame B1 is detected between the parking area lines k1, k2, and a parking frame B2 is detected between the parking area lines k3, k4. A parking frame A1 is also detected between the line segments (Ep', Em') of the edges of the noise.

The parking frame B1 is set to an appropriate shape (rectangle) and an appropriate size close to an actual parking frame. The parking frames B2, A3 have shapes and sizes slightly different from the actual shapes and sizes due to the deformation of the front portion and the rear portion. However, such differences do not significantly affect the parking, and fall within an allowable range. On the other hand, the parking frame A2 has a shape and a size different from the actual parking frame due to the large projection of the right portion toward the vehicle V and the setback of the left portion. Moreover, the parking frame A1 is set in a place different from the actual parking space. When such parking frames A1, A2 are sent to the vehicle control ECU 40, and displayed on the monitor 31, the parking assist may be affected, and the parking frame may be unstably displayed (static parking frame may not be seen, and slightly shaking parking frame may be seen).

In order to avoid this, the parking frame selection portion 114 determines whether the parking frame set by the parking frame setting portion 113 is a display target (i.e., to be registered in memory 120 as parking frame) or not (i.e., not to be registered in memory 120 as parking frame).

In this embodiment, an appropriate parking frame is only selected as the parking frame by determination (1) based on the position of the start point of the parking frame and determination (2) based on the length ratio of first and second sides of the parking frame. In addition, the determination (1) is not always necessary as long as at least the determination (2) is executed. In this case, the calculation speed can be improved. On the other hand, by executing the both determinations (1), (2), the detection accuracy of the parking frame can be improved. In this embodiment, the order is determination (1)→determination (2). However, the order is not limited thereto, and the order may be determination (2)→determination (1). Desired determinations may be executed in a desired order according to a relationship with an associated another system, a specification, and a user's request.

For example, "front portion" and "front" of the parking frame described herein are meant to be a portion close to the vehicle V and for example, "rear portion" and "rear" are meant to be a portion opposite to "front portion" and "front". As to the four vertexes (end points) constituting the rectangle of the parking frame, that is, the two end points of the first and second sides of the parking frame along the parking area lines, the end points close to the vehicle V are referred to as "start points" and the end points of the rear portion are referred to as "finish points". The right and left are determined when the parking frame is seen from the vehicle V side. In the example of FIG. 5, the parking frames 201 located on the right side in the traveling direction (arrow direction) of the vehicle V and the parking frames 201 located on the left side in the traveling direction of the vehicle V are right-left opposite.

Hereinafter, the details of the determinations (1), (2) will be described with reference to FIG. 7. FIG. 7 is a view in which the parking frames A1 to A3 and B1 to B2 detected by the parking frame setting portion 113 are virtually drawn on the overhead image G to facilitate understanding, but the lines and the end portions of the parking frames are not actually displayed on the overhead image G.

It will be described for the determination (1) based on the position of the start point of the parking frame. The parking frame selection portion 114 calculates the positions (coordinates) of the two start points of the first and second sides of each of the parking frames A1 to B2. When at least one of the two start points is separated from a predetermined region on the overhead image G, that is, is separated from the vehicle V (icon I) by a threshold or more (range shown by dashed line in FIG. 7) in the right and left direction, the parking frame is not determined as the display target.

In this embodiment, the threshold is set to 100 pixels. 100 pixels on the image corresponds to actual 3 m which may be set to the threshold. The threshold is not limited to this value, and may be set to an appropriate value according to the specification of the camera 20, the resolution of the image, and the like.

In the example shown in FIG. 7, the right and left start points (L2 and R2, L3 and R3, l1 and r1, l2 and r2) of the parking frames A2, A3, B1, B2 are within the threshold. These parking frames are determined as the display targets, and the positional information thereof is registered in the memory 120. On the other hand, the right start point R1 of the right and left start points (L1, R1) of the parking frame A1 is separated by the threshold or more. The parking frame A1 is thus not determined as the display target, and the position information thereof is deleted from the memory 120 by the parking frame selection portion 114. The parking frame A1 misdetected from the outside of the parking region can be deleted from the parking target or the display target.

It will be described for the determination (2) based on the length ratio of the first and second sides of the parking frame. The parking frame selection portion 114 calculates the lengths of a first side (left side) and a second side (right side) based on the coordinate values of the two start points and finish points of each of the parking frames A1 to B2, and calculates the length ratio based on the calculated lengths. When these length ratios satisfy all of the following formulas (a), (b), the parking frame is determined as the display target. On the other hand, when the length ratios do not satisfy at least one of the following formulas (a), (b), the parking frame is not determined as the display target.

(length of first side/length of second side)≥threshold (a)

(length of second side/length of first side)≥threshold (b)

When the threshold is set to 0.4, for example, the parking frame can be determined with the high accuracy. However, the threshold is not limited to 0.4, and an appropriate threshold can be set according to the resolution of the image and the photographing range, for example. Note that the start points and the finish points of the parking frame are the facing both end points of the line segment of the positive edge and the line segment of the negative edge of the parking area lines constituting the parking frame.

The parking frame selection portion 114 registers the information (coordinate value) of the parking frame determined as the display target in the memory 120 as parking frame registered data 121. On the other hand, the parking frame which is not determined as the display target is not registered in the memory 120 as the parking frame registered data 121.

The determination procedure of the parking frames A1, A3 illustrated in FIG. 7 will be described in details. As illustrated in FIG. 7, a right side RA3 of the parking frame A3 has 80 pixels and a left side LA3 of the parking frame A3 has 100 pixels. The parking frame A3 satisfies both of the above formulas (a), (b) as below. The parking frame A3 is thus determined as the display target, and the coordinate values thereof are registered in the memory 120.

$RA3/LA3=80/100=0.8>0.4$ $LA3/RA3=100/80=1.25>0.4$

On the other hand, a right side RA2 of the parking frame A2 has 40 pixels and a left side LA2 of the parking frame A2 has 120 pixels. The parking frame A1 does not satisfy the formula (a) as below. The parking frame A2 is thus not determined as the display target, and is not registered in the memory 120. As a result, the parking frame A2 which may affect the parking assist and the display of the parking frame can be deleted from the parking target and the display target.

$RA2/LA2=40/120=0.33<0.4$ $LA2/RA2=120/40=3.0>0.4$

The display control portion 115 sends the display control signal for displaying an image on the monitor 31 to the navigation device 30 to control the monitor 31. More specifically, the display control portion 115 sends the display control signal for displaying the road surface images around the vehicle V imaged by the camera 20 or the overhead image G in which these images are synthesized on the monitor 31. The display control portion 115 also sends the display control signal for displaying the parking frame image 202 showing the parking frame selected as the display target by the parking frame selection portion 114 to the navigation device 30 so as to superimpose the parking frame image 202 onto the road surface image or the overhead image G.

Figure 8A:
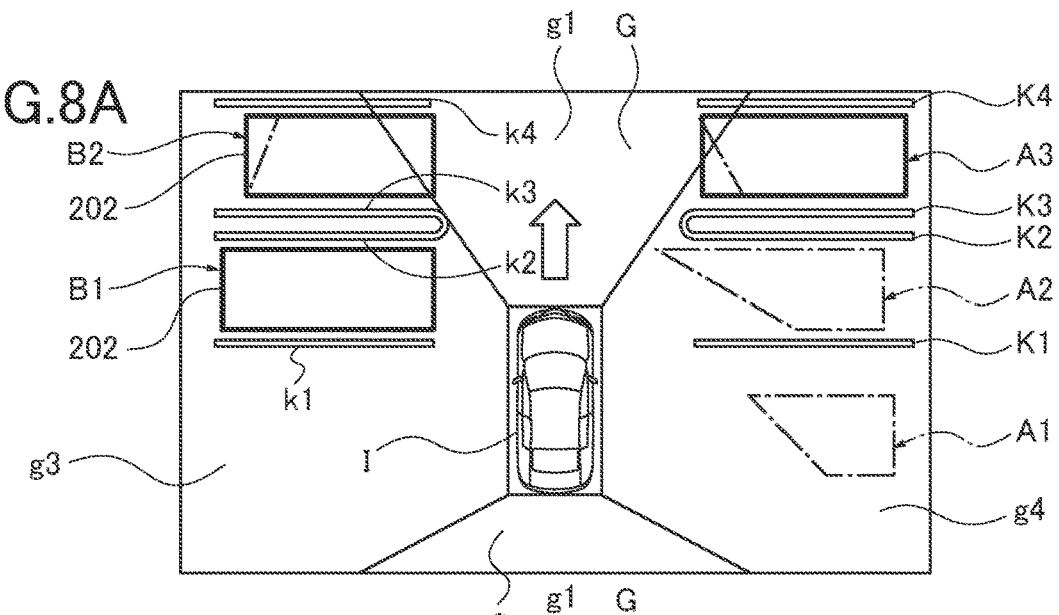
FIGS. 8A to 8C are views each describing one example of an operation of the image processor of the embodiment, and illustrating the overhead image and parking frame images that change by the traveling of the vehicle.

FIG. 8A illustrates the example of the image in which the overhead image G and the parking frame images 202 displayed on the monitor 31 are superimposed. As illustrated by the solid lines in FIG. 8A, the parking frame images 202 of the parking frames A3, B1, B2 determined as the display targets by the parking frame selection portion 114 are displayed on the monitor 31. In this case, the parking frame images 202 of the parking frames A3, B2 whose shapes are appropriately corrected by the navigation device 30 are displayed. On the other hand, as illustrated by the virtual lines in FIG. 8A, the parking frames A1, A2 which are not determined as the display targets by the parking frame selection portion 114 are not displayed on the monitor 31.

The parking frames are set and selected by the edge detection portion 111, the parking area line detection portion 112, the parking frame setting portion 113, and the parking frame selection portion 114, and also the display is controlled by the display control portion 115 every time the image photographed by the camera 20 is updated along the traveling of the vehicle V. Accordingly, when the parking frame firstly determined as the display target is not determined as the display target in the next process due to the effect of the shadow, for example, the previously displayed parking frame image may disappear from the monitor 31, and may be excluded from the parking target.

In order to control such a situation, in the image processor 100, the parking frame determined as the display target is tracked to keep appropriately displaying the parking frame image 202. More specifically, when the parking frame is not determined as the display target by the parking frame selection portion 114, the display control portion 115 sends the display control signal for displaying the parking frame image 202 showing the parking frame already determined as the display target to the navigation device 30 to control the monitor 31 so as to keep superimposing the parking frame image 202 onto the overhead image G. The appropriate display frame image is thereby kept being displayed even when the parking frame is not appropriately detected as long as the parking frame is once appropriately detected. Accordingly, the parking assist is appropriately performed, and a driver can easily see the image without feeling uncomfortable.

The memory 120 includes a recording medium, for example, a large capacity recording medium such as a hard disk drive and a semiconductor recording medium such as a ROM and a RAM. Various data for use in various operations in the control portion 110 are temporarily or non-temporarily stored in the memory 120.

As described above, the parking frame registered data 121 and parameter data 122 are stored in the memory 120. The parameter data 122 includes a threshold, a reference length of a parking area line, and a parking space width, and a threshold thereof. Various parameters for use in the image processor 100 such as a width and an angle of an extending direction of a parking area line can be stored in the memory 120. A plurality of parameters may be stored according to countries and regions where the parking assist device 1 is used as well as a shape and a size of a parking space (parking frame), and an appropriate parameter may be selected.

Figure 8B:
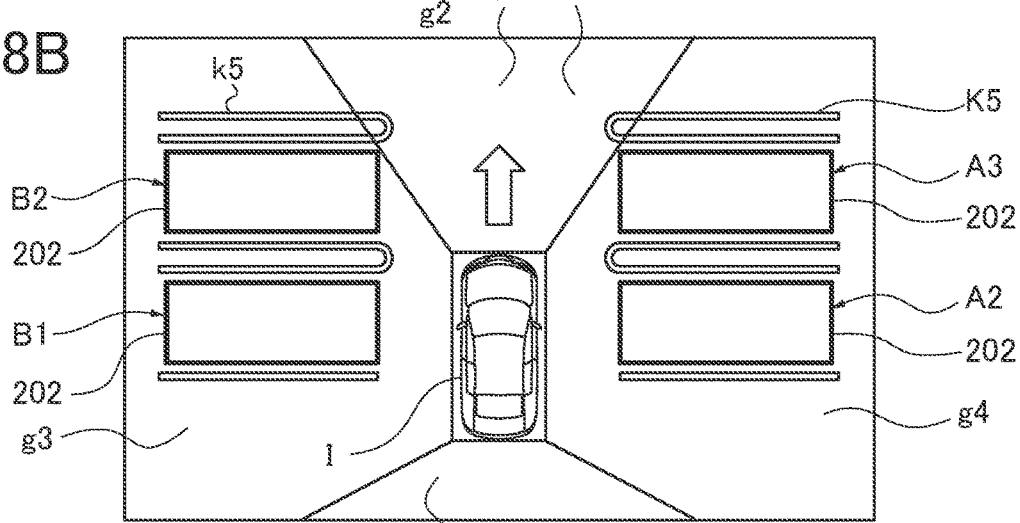
Figure 8C:
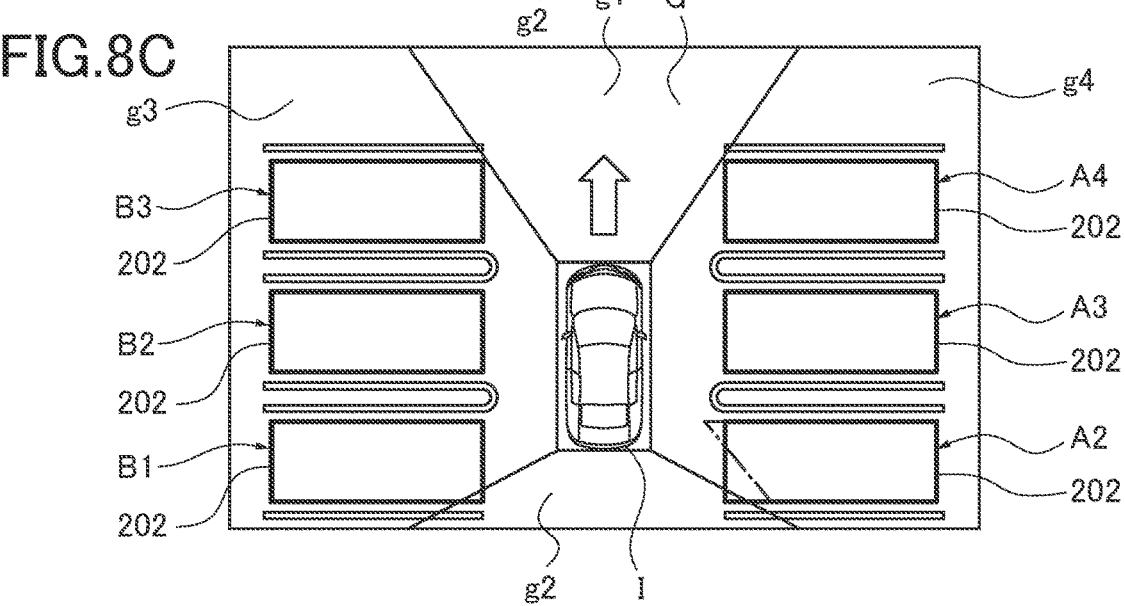
Figure 9A:
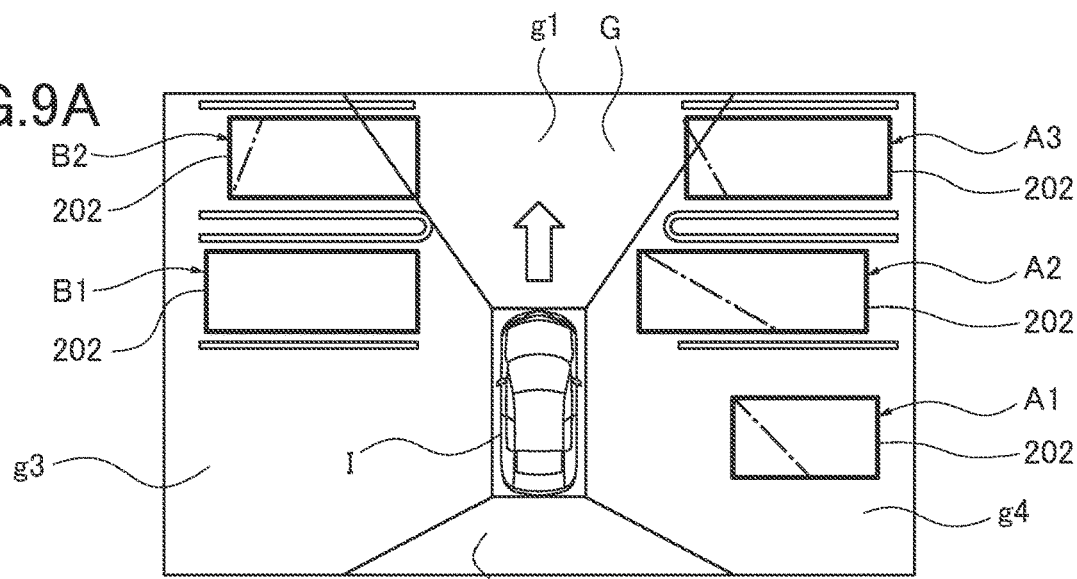
FIGS. 9A to 9C are views each illustrating the overhead image and the parking frame images that change by the traveling of the vehicle when the parking frame selection process of the image processor of the embodiment is not performed.
Figure 9B:
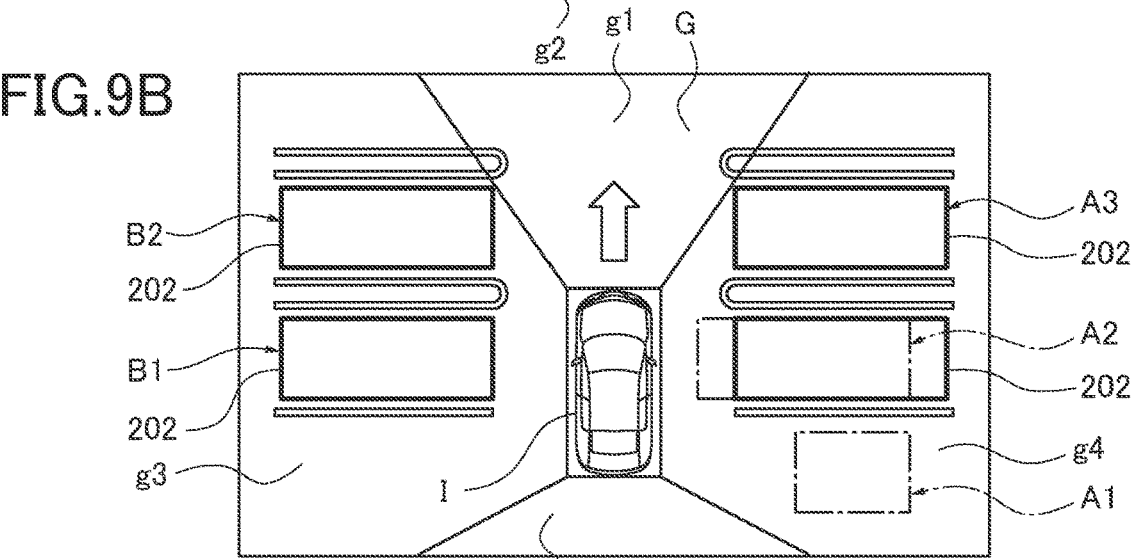
Figure 9C:
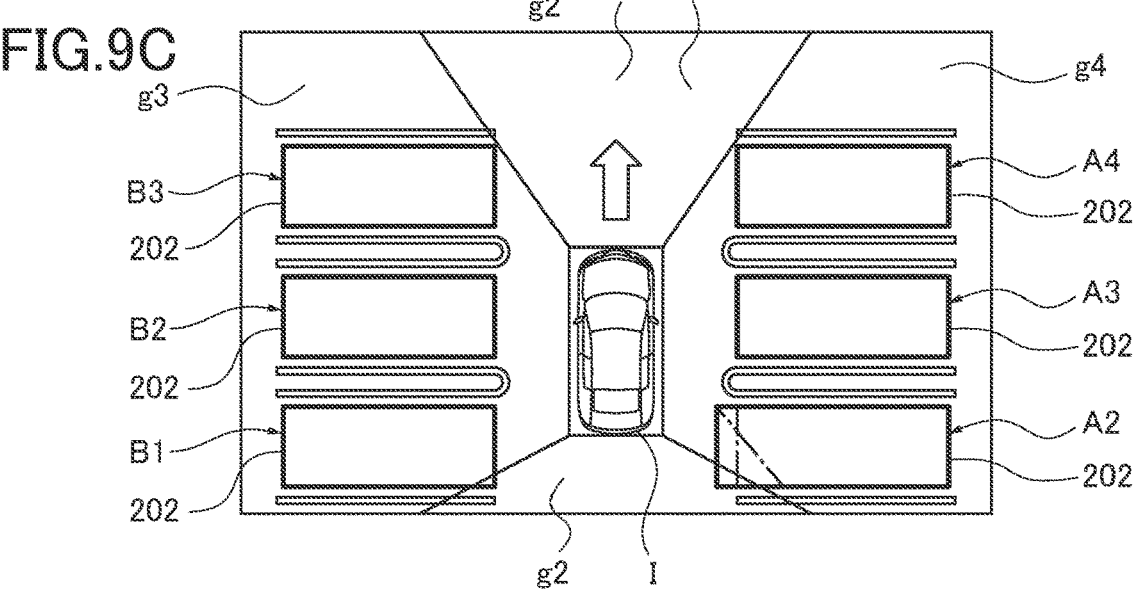

The effects of the parking frame selection process by the parking frame selection portion 114 will be described with reference to FIGS. 8A to 9C. FIGS. 8A to 8C are views illustrating the overhead images G and the parking frame images 202 that change according to the traveling of the vehicle V when the parking frame selection process is executed. FIGS. 9A to 9C are views illustrating the overhead images G and the parking frame images 202 that change according to the traveling of the vehicle V when the parking frame selection process is not executed.

When the parking frame selection process is not executed as before, not only the parking frame images 202 corresponding to the appropriately detected parking frames A3, B1, B2 but also the parking frame image 202 corresponding to the parking frame A1 which is not located in an actual parking region are displayed, as illustrated in FIG. 9A. The parking frame image 202 corresponding to the parking frame A2 in which the start points are misdetected projects from an actual location toward the icon I.

Next, when the vehicle V travels in the parking lot P to be located next to the parking frame A2, as illustrated in FIG. 9B, the effect of the shadow and the like is solved, and the parking frame A2 is appropriately detected while the parking frame A1 is not detected. In this case, as the parking frame image 202 of the detected parking frame A2 is correctly displayed, the driver may feel that the parking frame has been moved away from the icon I. Additionally, the parking frame image 202 of the parking frame A1 disappears from the screen. After that, when the vehicle V travels to be located as illustrated in FIG. 9C, the parking frame A2 is detected with an inappropriate shape as illustrated by the virtual line due to the effect of shadow and the like. In this case, the parking frame image 202 projects toward the icon I, and the driver may feel that the parking frame A2 has been projected. When the parking frame is unstably displayed as described, such an image is hard to see for the driver, and gives discomfort to the driver. Such an image may affect the parking assist.

On the other hand, when the parking frame selection process is executed as the present embodiment, the parking frame images 202 of the parking frames A1, A2 are not displayed, and the parking frame images 202 of the appropriately detected parking frames A3, B1, B2 are only displayed, as illustrated in FIG. 8A. Next, when the parking frame A2 is appropriately detected, the parking frame image 202 of the parking frame A2 is appropriately displayed on the overhead image G, as illustrated in FIG. 8B. After that, when the parking frame A2 is detected with an inappropriate shape, and is not determined as the display target, the parking frame image 202 of the appropriate parking frame A2 detected from the past overhead image G illustrated in FIG. 8B is kept being displayed (FIG. 8C). Accordingly, the parking frame is displayed without being unstably displayed, the driver can easily see the parking frame without feeling uncomfortable, and the parking assist can be performed with high accuracy.

Next, one example of the operation of the image processor 100 of the present embodiment will be described with reference to the flowchart of FIG. 4 and FIGS. 6 to 8C.

Figure 4:
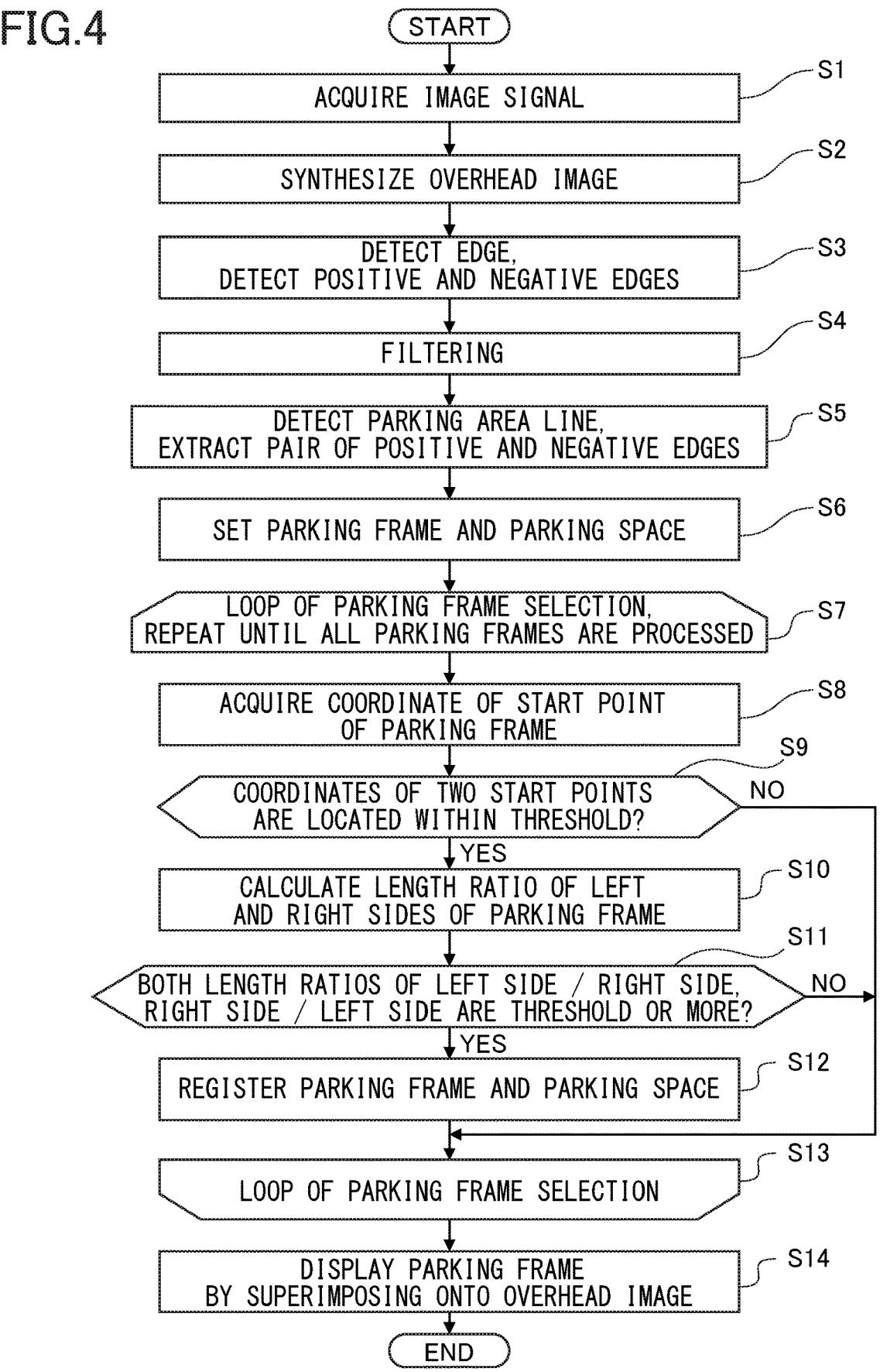
FIG. 4 is a flowchart describing one example of an operation of the image processor of the embodiment.

FIG. 4 is a flowchart describing the operation of the image processor 100. The operation shown in the flowchart of FIG. 4 starts in response to the input of the automatic parking start instruction by a driver's operation of the automatic parking start switch (not shown).

In Step S1, the control portion 110 of the image processor 100 acquires the image signals of the road surface R around the vehicle V imaged by the camera 20.

In Step S2, the control portion 110 generates a signal in which the image signals are synthesized based on the image signals acquired in Step S1. The signal synthesized in Step S2 is for displaying an overlooked image (overhead image G) as if taken by a camera disposed above the vehicle V on the navigation device 30. The technique of creating such an overhead image is known, and disclosed in JP1991-99952A and JP2003-118522A as one example.

Alternatively, the images are not synthesized in Step S2 or the images may be synthesized as in Step S2 after extracting the positive edge and the negative edge in the next Step S3. However, it is preferable to extract the positive edge and the negative edge after creating the overhead image G because the processing load of the image processor 100 can be reduced.

In Step S3 (edge detection step), as described above, the edge detection portion 111 scans the overhead image G synthesized in Step S2 in a predetermined direction, and extracts the positive edge and the negative edge in the image based on the brightness contained in the image signals.

In the example illustrated in FIG. 6, the edge detection portion 111 scans the overhead image G in the X axis positive direction to detect the positive edges and the negative edges in the image. As a result, the line segments Ep of the positive edges shown by the thick solid lines and the line segments Em of the negative edges shown by the thick dashed lines are detected. When the pixels are scanned in the X axis negative direction, the positive edges and the negative edges are reversed. The positive edges and the negative edges are also detected based on the information of the color parameter (for example, RGB, RGBA) contained in the image signals. In this case, these are detected based on the change in the size (tone) of a predetermined color.

In the next Step S4, the positive edges and the negative edges detected by the edge detection portion 111 in Step S3 are filtered based on the above-described reference length. The short edge which is noise due to the light reflection on the road surface, the waste, and the stain is thereby cancelled. This filtering may be performed after the extraction of the pair in the next Step S5, but a high speed image process may be achieved by eliminating the noise before the extraction of the pair.

In the next Step S5 (parking area line detection step), the parking area line detection portion extracts the pair of the line segment of the positive edge and the line segment of the negative edge next to each other from a plurality of edge segments detected in Step S4. At this point, the distance between the positive edge and the negative edge next to each other on the road surface based on the overhead image G is calculated. When this distance falls within the range of predetermined line width±permissive error, the line segments are determined as the pair of the edges constituting the parking area lines.

In the next Step S6 (parking frame setting step), the parking frame setting portion 113 detects the parking frame and the parking space by the above-described procedure based on the pair of the edges constituting the parking area lines. The detected information (coordinate value) of the parking frame is temporarily stored in the memory 120. In the example illustrated in FIG. 7, the parking frames A2, A3, B1, B2 corresponding to the actual parking frames and the parking frame A1 which is not an actual parking frame are detected.

By the loop process (parking frame selection step) of the parking frame selection in the next Steps S7 to S11, the parking frame selection portion 114 determines only an appropriate parking frame as the display target, and eliminates an inappropriate parking frame which is not determined as the display target. The processes of Steps S7 to S13 end when it is determined that the processes are performed to all of the parking frames detected in Step S6.

In Step S8, the parking frame selection portion 114 acquires the positions (coordinates) of the two start points of the parking frame of the process target, and in Step S9, determines whether or not the coordinates of the two start points locate within the threshold from the vehicle V (icon I). When the parking frame selection portion 114 determines that the coordinates locate within the threshold (YES), the process proceeds to the next Step S10.

On the other hand, when the parking frame selection portion 114 determines either of the coordinates of the two start points separates by the threshold or more (NO), the parking frame is not determined as the display target. In this case, the process skips Steps S10 to S12 and proceeds to Step S13 to determine whether or not there is a next parking frame to be processed. When there is a parking frame, the process returns to Step S7 to perform the process to the next parking frame. When there is no parking frame to be processed, the loop ends, and the process proceeds to Step S14.

By the processes of the above Steps S8, S9, as the parking frame A1 illustrated in FIG. 7, the parking frame detected from a place except the actual parking region is not determined as the display target, and is cancelled without being registered as the parking frame.

In the next Step S10, the parking frame selection portion 114 calculates the length of the right side and the left side of the parking frame based on the coordinate values of the two start points and finish points of the parking frame, and calculates the length ratio (left side/right side, right side/left side). Next, in Step S11, the parking frame selection portion 114 determines whether or not the length ratio is the threshold or more.

When the parking frame selection portion 114 determines that the two length ratios are the threshold or more (YES), the parking frame selection portion 114 determines the parking frame as the display target, and the process proceeds to Step S12. On the other hand, when the parking frame selection portion 114 determines that one or both of the length ratios is/are less than the threshold (NO), the parking frame selection portion 114 does not determine the parking frame as the display target. In this case, the process skips Step S12 to proceed to Step S13, and it is determined whether or not there is a next parking frame to be processed. When there is a parking frame, the process returns to Step S7, and the process to the next parking frame is performed. When there is no parking frame, the loop ends, and the process proceeds to Step S14.

By the process of Step S11, for example, as the parking frame A2 of FIG. 7, for example, the parking frame detected with a shape different from that of the actual parking frame by an allowance or more is not determined as the display target, and is cancelled without being registered as the parking frame.

In Step S12, the parking frame (parking space) determined as the display target is registered in the memory 120. More specifically, the coordinate values of the end points of the line segment of the positive edge and the line segment of the negative edge next to each other, which constitute the parking frame, are set as the coordinate values of the start points or the start points of the parking frame to be registered in the memory 120 as the parking frame registered data 121. At this point, the parking frame can be specified as long as the coordinate values of at least two start points of the parking frame are registered. In this case, the memory capacity can be reduced as much as possible. However, the coordinate values of the four points may be registered. The angle (extending direction) of the parking area line 200 and the information required for another vehicle parking process may be added to the parking frame registered data 121.

Next, the process proceeds to Step S13 to determine whether or not there is a next parking frame to be processed.

When there is the parking frame, the process returns to Step S7 to perform the process to the next parking frame. When there is no parking frame to be processed, the loop ends, and the process proceeds to Step S14.

In Step S14 (display control process), the display control portion 115 generates the display control signal for displaying the parking frame image showing the parking frame determined as the display target and registered in the memory 120 so as to keep superimposing the parking frame image onto the overhead image, and sends the signal to the navigation device 30. The image in which the parking frame images 202 of the parking frames A3, B1, B2 are superimposed onto the overhead image G is displayed on the monitor 31 as illustrated in FIG. 8A.

The parking frame registered data 121 registered in the memory 120 is sent to the vehicle control ECU 40, and various processes that assist the parking of the vehicle V are performed.

The process of the above Steps S1 to S14 are repeated every time the image signal is acquired from the camera 20. When the parking frame A2 is appropriately detected in addition to the parking frames A3, B1, B2 by the traveling of the vehicle V in the parking lot P, the parking frame images 202 of the parking frames A3, B1, B2 and the parking frame image 202 of the parking frame A2 are displayed as illustrated in FIG. 8B. After that, by the traveling of the vehicle V, when the parking frames A3, A4, B1, B2, B3 are appropriately detected, the parking frame images 202 are superimposed onto the overhead image G to be displayed as illustrated in FIG. 8C. At this point, even when the parking frame A2 is not again determined as the display target, the parking frame image 202 (refer to FIG. 8B) already determined as the display target is displayed by superimposing it onto the overhead image G.

The effect of the image processor will be described. In the image processor 100 of the present embodiment as constituted above, the parking area line detection portion 112 detects the parking area lines from the image acquired by the camera 20 that images the road surface around the vehicle V. The parking frame setting portion 113 sets the parking frame based on the detected parking area lines. The parking frame selection portion 114 calculates the length ratios of the adjacent first and second sides of the set parking frame. When the length ratio falls within the predetermined range, the parking frame is determined as the display target, and when the length ratio falls outside the predetermined range, the parking frame is not determined as the display target. The display control portion 115 controls the monitor 31 for displaying the parking frame image 202 showing the parking frame determined as the display target by the parking frame selection portion 114 by superimposing the parking frame image onto the overhead image G.

The parking frame which is not detected with an appropriate shape and an appropriate size and the parking frame which is detected from the place except the actual parking region due to the light reflection, the existence of the obstacle, and the fluctuation of the lens, for example are not determined as the parking targets, and are thereby canceled. On the other hand, the parking frame which is detected with an appropriate shape and an appropriate size is only registered as the parking frame suitable for parking. The parking frame image 202 is superimposed onto the overhead image G and the superimposed image is displayed on the monitor 31. Accordingly, the image processor and the image processing method capable of clearly displaying the parking frame and detecting the parking frame with high accuracy can be provided.

With the image processor 100 or the image processing method, the parking assist device, the parking assist method, the traveling assist device, and the traveling assist method capable of detecting the parking frame and the traveling lane with high accuracy can be provided.

In the present embodiment, when the first side and the second side of the parking frame satisfy the following formulas, the parking frame selection portion 114 determines the parking frame as the display target, and when the first side and the second side of the parking frame do not satisfy at least one of the following formulas, the parking frame selection portion 114 does not determine the display frame as the display target. The detection accuracy of the parking frame can be thereby improved.

(length of first side/length of second side)≥threshold (length of second side/length of first side)≥threshold In the present embodiment, when the end point of the parking frame on the vehicle side is separated from the position of the vehicle on the image by a predetermined distance or more, the parking frame selection portion 114 does not determine the parking frame as the display target. The detection accuracy of the parking frame can be thereby further improved.

In the present embodiment, when the parking frame selection portion 114 does not determine the parking frame as the display target, the display control portion 115 controls the monitor 31 for displaying the parking frame image 202 showing the parking frame already determined as the display target by superimposing the parking frame image 202 onto the overhead image G. The parking assist can be thereby performed with higher accuracy, a driver can easily see the parking frame, and a driver can comfortably drive without discomfort.

In the present embodiment, the edge detection portion 111 scans the overhead image G in a predetermined direction to detect the pixel in which the variation of the brightness or the color parameter contained in the image signal increases to be larger than the threshold, and detects the portion in which the detected pixel array has a predetermined length or more as the edge. The parking area line detection portion 112 detects the parking area line based on the edge detected by the edge detection portion 111. The parking area line can be thereby detected with high accuracy, and the calculation speed is improved. As a result, the parking frame can be detected with higher accuracy and higher speed.

The embodiment of the present disclosure has been described above in details with reference to the drawings. However, the above embodiment is only an example of the present disclosure. The embodiment may be modified and/or applied without departing from the spirit of the present disclosure.

For example, in the image processor 100 of the above embodiment, the edge is detected based on the size and the direction (positive direction or negative direction) of the change in the information of the color parameter (for example, RGB, RGBA) and the brightness of the image. However, the embodiment is not limited thereto, and the edge may be detected based on the size and the direction of the change in another information contained in the image signal.

What is claimed is:

1. An image processor comprising:
a parking area line detection portion configured to detect a parking area line from an image acquired by an imaging device configured to image a road surface around a vehicle;
a parking frame setting portion configured to set a parking frame based on the detected parking area line;
a parking frame selection portion configured to calculate a length of adjacent first and second sides of the set parking frame based on coordinate values of start points and finish points of the set parking frame, calculate a length ratio of the adjacent first and second sides based on the calculated length, determine the parking frame as a display target when the length ratio falls within a predetermined range, and not to determine the parking frame as the display target when the length ratio falls outside the predetermined range; and
a display control portion configured to control a display portion for displaying a parking frame image showing the parking frame determined as the display target by the parking frame selection portion so as to keep superimposing the parking frame image onto the image acquired by the imaging device, wherein
the parking frame selection portion is configured to determine the parking frame as the display target when the first side and the second side of the parking frame satisfy all of the following formulas, and not to determine the parking frame as the display target when the first side and the second side do not satisfy at least one of the following formulas, (length of first side/length of second side)≥threshold (length of second side/length of first side)≥threshold, the threshold is set according to a resolution and a photographing range of the image.

2. The image processor according to claim 1, wherein the parking frame selection portion is configured not to determine the parking frame as the display target when an end point of the parking frame on a vehicle side is separated from a position of the vehicle on the image by a predetermined distance or more.

3. The image processor according to claim 1, wherein the display control portion is configured to control the display portion for displaying the parking frame image showing the parking frame already determined as the display target so as to keep superimposing the parking frame image onto the image acquired by the imaging device when the parking frame is not determined as the display target by the parking frame selection portion.

4. The image processor according to claim 1, comprising:
an edge detection portion configured to scan the image acquired by the imaging device in a predetermined direction to detect a pixel in which a variation of a brightness or a color parameter contained in an image signal increases to be larger than a threshold, and detects a portion in which the detected pixel array has a predetermined length or more as an edge, wherein
the parking area line detection portion is configured to detect the parking area line based on the edge detected by the edge detection portion.

5. An image processing method, comprising:
a parking area line detection step of detecting a parking area line from an image acquired by an imaging device that images a road surface around a vehicle;
a parking frame setting step of setting a parking frame based on the detected parking area line;
a parking frame selection step of calculating a length of adjacent first and second sides of the set parking frame based on coordinate values of start points and finish points of the set parking frame, calculate a length ratio of the adjacent first and second sides based on the calculated length to determine the parking frame as a display target when the length ratio falls within a predetermined range and not to determine the parking frame as the display target when the length ratio falls outside the predetermined range; and
a display control step of sending a display control signal for displaying a parking frame image showing the parking frame determined as the display target by the parking frame selection step so as to keep superimposing the parking frame image onto the image acquired by the imaging device, wherein
the parking frame selection step determines the parking frame as the display target when the first side and the second side of the parking frame satisfy all of the following formulas, and does not determine the parking frame as the display target when the first side and the second side do not satisfy at least one of the following formulas, (length of first side/length of second side)≥threshold (length of second side/length of first side)≥threshold, the threshold is set according to a resolution and a photographing range of the image.

* * * * *